United States Patent [19]

Cheo et al.

[11] Patent Number: 4,973,140
[45] Date of Patent: Nov. 27, 1990

[54] REENTRANT TRAVELING-WAVE SINGLE SIDEBAND OPTICAL MODULATOR

[75] Inventors: Peter K. Cheo, Waterford; Robert A. Rubino, Tolland; Meyer Gilden, West Hartford, all of Conn.

[73] Assignee: United Technologies Corporation, Hartford, Conn.

[21] Appl. No.: 301,819

[22] Filed: Jan. 25, 1989

[51] Int. Cl.$^5$ .................... G02F 1/01; G02B 6/10; H01P 1/00; H03F 7/00
[52] U.S. Cl. .................... 350/353; 350/355; 350/96.13; 307/430; 333/218
[58] Field of Search ............ 350/353, 355, 356, 96.13, 350/96.14; 307/424, 425, 430; 333/218

[56] References Cited

U.S. PATENT DOCUMENTS

| 3,462,712 | 8/1969 | Boddy et al. | 350/355 X |
| 3,897,996 | 8/1975 | Tsunada et al. | 350/355 X |
| 3,902,061 | 8/1975 | Harris | 350/355 X |
| 3,984,675 | 10/1976 | Corcoran | 307/424 X |

Primary Examiner—Eugene R. LaRoche
Assistant Examiner—Michael Shingleton
Attorney, Agent, or Firm—McCormick, Paulding & Huber

[57] ABSTRACT

A novel single sideband electro-optic modulator is characterized by a reentrant waveguide structure. The reentrant waveguide structure allows for a factor of four enhancement of conversion efficiency and a factor of five reduction in phase velocity mismatch between the optical wave and modulating microwave due to microwave dispersion in wideband (2 GHz) operation.

18 Claims, 2 Drawing Sheets

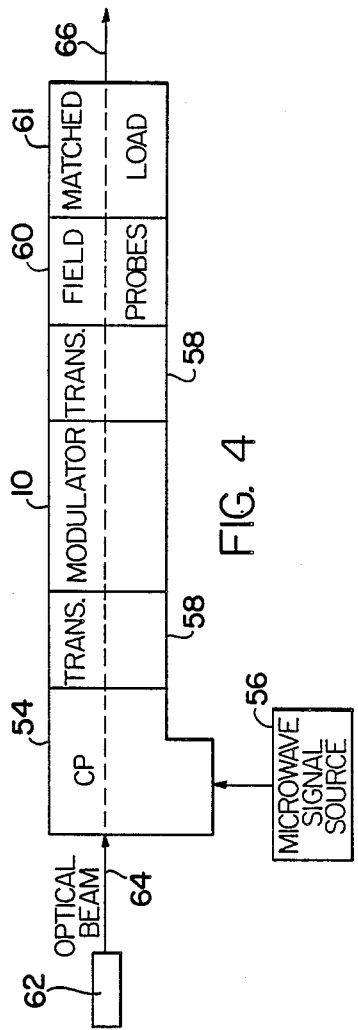
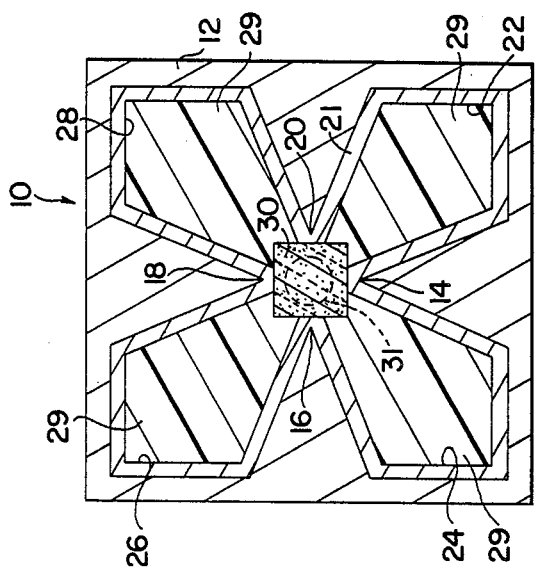

REENTRANT TRAVELING-WAVE SINGLE SIDEBAND OPTICAL MODULATOR

TECHNICAL FIELD

This invention relates to electro-optic modulators and more particularly to single sideband reentrant waveguide traveling-wave optical modulators for modulating an infrared optical beam at microwave frequencies with high conversion efficiencies and greatly reduced levels of microwave power. All of the optical energy under optimum conditions can be transferred to one side band.

BACKGROUND OF THE INVENTION

Single sideband electro-optic modulators have applications in coherent laser radar and in high resolutions spectroscopy. Optical single sideband generation can be achieved by phase velocity matching a circularly polarized (CP) optical field with a circularly polarized microwave field in a electro-optic (EO) crystal exhibiting 3-fold crystallographic symmetry The microwave field generates an optical indicatrix which rotates at half the microwave frequency. The rotating optical indicatrix, which is analogous to an optical field propagating through a spinning waveplate, produces a single sideband, up-shifted or down-shifted signal dependent on the rotation sense of the two fields at a frequency equal to twice the optical indicatrix angular rotation frequency. A passively achromatic quarter waveplate over the wave length range of interest is used to generate a circularly polarized optical wave.

Broadband frequency shifting of a laser beam at high speeds requires traveling-wave electro-optic phase modulation of the optical carrier frequency at microwave frequencies. Known optical modulators of this type are characterized by a conventional square waveguide structure filled with a cadmium telluride (CdTe) crystal. Generally, high levels of microwave power are needed.

To establish the required electric field strength with reduced poWer levels, the microwave energy must be confined to the smallest possible cross-sectional area and be concentrated in the electro-optic crystal. In addition, to convert the laser power into only one sideband at microwave frequencies, a near synchronous traveling-wave interaction with the optical beam is required. Thus, the modulator structure must provide a good velocity match that includes having a cut-off frequency well below that of the desired frequencies to minimize dispersion effects. Moreover, the overlapping of a Gaussian optical field with a near uniform microwave field must be perfect in order to avoid power transfer into other, unwanted sidebands. A suitable modulator structure must also have a 2-fold symmetry in order to establish a circularly polarized microwave field with uniformly distributed intensity within the interaction region.

SUMMARY OF THE INVENTION

An object of the present invention is to provide a reentrant electro-optic modulator for generating optical signals in a single frequency sideband with reduced levels of microwave power.

Another object of the present invention is to provide a reentrant electro-optic single sideband modulator characterized by very high conversion efficiency with small cross-sectional areas.

According to the present invention, a reentrant electro-optic modulator for modulating a laser signal with a microwave signal that generates signals in a single frequency sideband includes an outer metal housing extending along and coaxial with a propagation axis. A microwave electrode mechanism is included having four electrode elements symmetrically configured within the housing along the propagation axis. Each element respectively has a metal portion adjacent to an inner housing cavity. An optically active element extends along the propagation axis within reentrant ridge or fin portions of the electrode mechanism for guiding the laser signal through the modulator. An optically passive dielectric material is positioned within each of the cavities. The modulator is characterized by an interface between the reentrant ridge or fin portions of the electrode mechanism and the optical element such that the optical element dimension thereat substantially exceeds the fin portion dimension.

According to another aspect of the present invention, a circuit for providing carrier suppressed, single sideband modulation at microwave frequencies of an optical signal includes microwave signal source for providing spatially orthogonal and time quadrature microwave signals for launching the circularly polarized orthogonal mode microwave signals. A first transition structure is adaPted to receive the microwave signals and includes a plurality of metal fin electrodes, each adapted to receive at a first end portion thereof a corresponding modulator electrode end portion. Each of the metal fin electrodes has a tapered portion opposing the first end thereof to provide an impedance match to the microwave signal source. Also included is a reentrant modulator that receives the first transition structure and has first and second end portions. The modulator includes an outer metal housing extending along and coaxial with a propagation axis. A microwave electrode mechanism that includes a plurality of electrode elements is symmetrically configured within the housing along the propagation axis with each element adjacent to an inner cavity. An optically active element extends along the propagation axis within the electrode mechanism for guiding the laser signal through the modulator. An oPtically passive dielectric material is positioned within each of the element cavities. The modulator is characterized by an interface between reentrant ridge or fin portions of the electrode mechanism and the optical element such that the optical element dimension thereat substantially exceeds the fin portions dimension. A second transition structure is included and is adapted to receive the modulator second end portion. The second transition structure includes a plurality of metal fin electrodes each adapted to receive at a first end thereof a corresponding one of the modulator electrodes. Each of the metal fin electrodes has a tapered portion opposing the first end to provide an impedance match to an adjacent microwave signal carrying element. The circuit finally includes a matched load for terminating the microwave signals without reflection that is configured with the second transition structure. The first and second transition structures and the modulator are configured to receive and transmit the optical signal.

BRIEF DESCRIPTION OF THE DRAWINGS

FIG. 1 is a sectioned illustration of a reentrant waveguide modulator provided according to the present invention.

FIG. 4 is a simplified schematic illustration of a frequency shifter circuit incorporating the reentrant waveguide modulator of FIG. 1 and the microwave transition mechanism of FIG. 2.

DESCRIPTION OF THE PREFERRED EMBODIMENT

Figure 2:
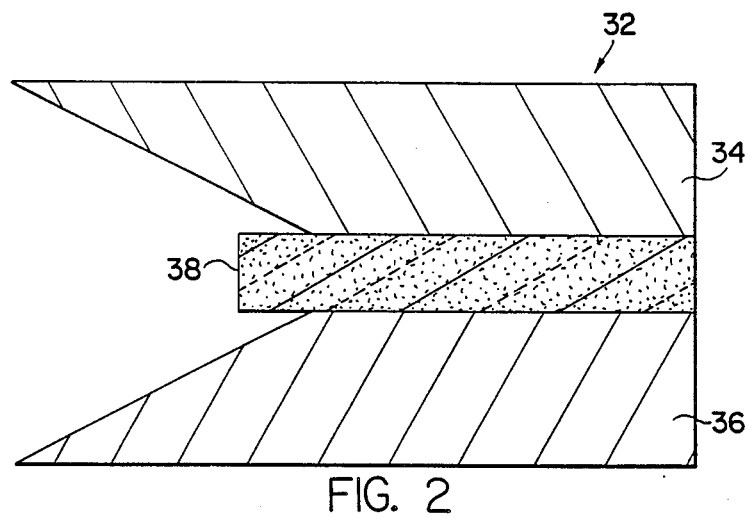
FIG. 2 is a lengthwise sectioned illustration of a microwave transition mechanism provided according to the present invention.

Referring now to FIG. 1, there is illustrated in cross-section a reentrant microwave modulator 10 provided according to the present invention. The modulator 10 comprises a rectangular metal housing 12 in which is contained a plurality of symmetric electrodes 14, 16, 18 and 20 and cavities 22, 24, 26 and 28 that extend radially about the housing. The electrodes are preferably integral with the housing. A high conductivity metallization 2 can be added to the electrode walls and the inner walls of the housing to minimize microwave losses and dissipation. A dielectric material 29 fills the cavities in the preferred embodiment. The central portion of the modulator comprises an optically active material 30, such as gallium phosphide, gallium arsenide or cadmium telluride crystals that extend the length of the modulator and receives an optical signal such as a laser beam.

A modulator fabricated according to the present invention achieves efficient sideband conversion with a significant reduction of microwave drive power. In the modulation frequency range of 8 to 18 GHz, cut off frequency considerations mandate large cross sections for conventional square waveguides and hence large drive power. However, the present reentrant modulator relaxes this geometric limitation, thereby allowing a significant reduction in microwave drive power. Theoretical analysis of the reentrant waveguide using a finite difference algorithm predicts four times less microwave drive power than an equivalent square Waveguide. In addition, the cavity characteristic of the present reentrant modulator allows for tailoring of the microwave propagation velocity by inserting various dielectric material into the four quadrants of the modulator's structure. For the material selection where the microwave phase velocity in the bulk material is already much less than the optical velocity (e.g. LiNbO3), control of the fringing fields in the four unfilled quadrants can be used to advantage to increase the phase velocity to match that of the optical beam. Hence, degradation of the power conversion efficiency arising from mismatching of the optical and microwave phase velocities can be reduced with the present reentrant structure.

The present reentrant modulator can be operated in the X to Ku-band with enhanced modulation efficiency. Extended spectral response of the present modulator over a very broad tuning range of the carrier wavelength from the visible (0.5 um) is obtained to the infrared (10.6 um) by inserting a suitable electrooptic crystal into the reentrant waveguide.

As detailed hereinafter, the present invention can be configured to generate single side band laser power or frequency shifting to a frequency of 9 GHz away from the carrier with a 3 cm long GaP electrooptic crystal for laser wavelengths tunable from 0.7 to 0.9 microns. With a CdTe electrooptic crystal, the modulator can be used for modulation of laser signals whose wavelengths vary from 1 to greater than 16 microns.

Moreover, a modulator provided according to the present invention is characterized by a large field strength to microwave power ratio, a velocity match between the microwave and optical beams, a uniform field distribution across the optical beam and a broadband impedance match to the electrode structure. Note in FIG. 1 that the four electrodes 14, 16, 18 and 20 have a selected width at the point of contact with the crystal material 30 whose magnitude is selected to be well below that of the corresponding material width in order for the electric field strengths to reach optimum values in the center of the crystal.

The factors which enter into the overall figure of merit for efficient use of the microwave power provided to reentrant modulators are (1) obtaining the largest possible electric field strength for a given level of microwave power, (2) obtaining a field distribution for the optical beam cross-section 31 that is as uniform as possible and (3) obtaining a good velocity match for the traveling Waves. Factors 1 and 2 are related to the choice of the specific dimensions while factor 3 is related to the choice of the dielectric materials. The advantages of a modulator provided according to the present invention can be seen by reference to Tables 1 and 2 which compare the parameters of a reentrant modulator provided according to the present invention with a conventional square waveguide (bulk modulator). The figures presented in these tables correspond to an idealized reentrant structure that has a step in the electrode width near the crystal surface in order to produce a maximum field strength in the center of the crystal. A device with square size is preferred so that close fitting dielectric inserts can easily be machined for assembly.

Table 1 contains a comparison of several parameters that characterize a conventional rectangular waveguide structure (bulk modulators) and a reentrant modulator as detailed above. Note that the cut-off frequencies are given for the devices along with their nominal operating frequencies. A value for the electric field (E) of 6,000 volts per centimeter in gallium phosphide corresponding to 100 percent conversion to a single sideband was used in calculating the power levels referenced therein. A dielectric constant of 10 with a length of 3 centimeters and a velocity match for both of the microwave and optical waves were assumed for these calculations. Note that tabulated percentage change in relative velocities is based on only waveguide dispersion which is dependent upon the respective cut-off frequencies of the devices. The calculated change in velocities assumes that the microwave signal is chirped by 2 GHz and that there is a velocity match at the center frequency. As detailed in Table 1, the most striking results are that the power levels required for a reentrant structure is approximately a factor of four less than for a rectangular waveguide and that the changes in velocities due to frequency chirping with dispersion are greatly reduced.

The conversion efficiency is degraded by a velocity mismatch between the microwave and the optical beam. Further, if the velocity mismatch varies with frequency during a chirp signal, an amplitude modulation would be induced. Table 2 illustrates how the velocity mismatch or difference in the index of a fraction causes a difference in phase of the microwave signal when the beam enters the modulator as compared to the phase When the beam leaves. A phase difference of about 150° causes a corresponding decrease in signal of about 3dB in magnitude. Table 2 illustrates this effect for several different lengths of a reentrant modulator. Note further that phase matching is also dependent upon mechanical tolerances in the device structure which can induce small air gaps that effect the phase velocity of the microwaves. Another problem associated with the traveling wave interaction is the distortion of the linearity of the chirp due to the dispersion in the microwave velocity resulting from the existence of a cut-off frequency or to the spurious deviations in the phase shift With respect to frequency caused by the matching networks. With a chirped microwave signal, this dispersion results in an additional frequency modulation. The reduced dispersion on the reentrant structure minimizes the distortion of the chirped signals. However, this distortion has been found to be small. The deviation in the frequencies expected from a typical operating condition, such as where the cut-off frequency is approximately 0.7 of the operating frequency and the chirp rate is about 1 GHz per microsecond, would be about 100 kHz. A similar estimate can be made for matching network imperfections.

TABLE I

| | | Effect of Geometry | | | |
|---|---|---|---|---|---|
| Type | Frequency, GHz | Cut-Off, GHz | Size, in. | Power, kW | 0.5 Δv/v*% |
| SQR | 10 | 5.75 | 0.325 | 84.2 | ±6.3 |
| WG | 10 | 7.10 | 0.263 | 47.4 | ±15.9 |
| | 15 | 9.8 | 0.191 | 26.9 | ±6.75 |
| | 15 | 11.6 | 0.161 | 15.0 | ±16.7 |
| REENT | 10-15 | 1.78 | 0.5/0.03/0.060* | 25.7 | ±0.34 |
| | | 1.71 | 0.5/0.02/0.040 | 12.5 | ±0.3 |
| | | 4.21 | 0.24/0.024/0.048 | 13.4 | ±2.5 |

*OUTSIDE/FIN/CRYT
**E = 6000 v/cm (Ga P) ε = 10, L = 3 cm
***Δf = 2 GHz

TABLE II

Phase Difference From Velocity Mismatch or Index of Refraction Difference

| | | | | | CRYSTAL | |
| | LENGTH (cm) | | | | LENGTH cm | |
| MISMATCH | 3 | 6 | 9 | $\eta - \sqrt{\epsilon}$ | 3.00 | 9.00 |
|---|---|---|---|---|---|---|
| 00.3% | 3.4 | 6.8 | 10.2 | 0.01 | 3.60 | 10.80 |
| 02.5% | 28.5 | 57.0 | 85.0 | 0.02 | 7.20 | 21.60 |
| 06.5% | 74.0 | 148.0 | 222.0 | 0.05 | 18.00 | 54.00 |
| 16.% | 182.0 | 364.0 | — | 0.10 | 36.00 | 108.00 |
| | | | | 0.15 | 54.00 | 162.00 |

PHASE DIFFERENCE degrees

As noted above, a reentrant modulator provided according to the present invention when compared with a square waveguide displays in the X band of frequencies, a factor of four reduction in power with a lower cut-off frequency that greatly reduces dispersion effects on velocity matching. The use of two dielectric media having different dielectric constants also allows for a correction of the velocity mismatch.

Figure 3:
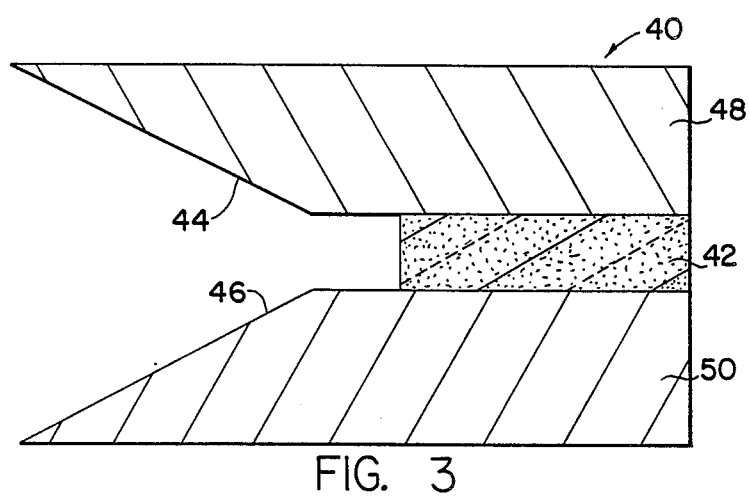
FIG. 3 is a lengthwise sectioned illustration of a microwave transition mechanism alternative to that of FIG. 2.

FIG. 2 is a simplified schematic illustration of a longitudinal section of a transition mechanism 32 provided according to the present invention. The transition mechanism 32 is configured at either end of the modulator described hereinabove with respect to FIG. 1 to provide the necessary microwave matching in a frequency shifting circuit. Visible in FIG. 2 are electrodes 34 and 36 which taper away from the crystal to blend into a normal square waveguide. These are contained in metallic square cross section housing (not shown in FIGS. 2 or 3). The transition mechanism of FIG. 2 is characterized by the protruding crystal material 38 which receives the optical beam. In the transition mechanism, the electrodes or fins are tapered away from the crystal to blend to a normal square waveguide. A linear taper is adequate for bandwidths of approximately 2 GHz. The most critical region for impedance matching is at the end interface with the crystal. FIG. 3 contains an alternative transition mechanism 40. As shown therein, the electro-optic crystal 42 is recessed from the end of the tapered region 44 and 46 of electrodes 48 and 50 by approximately ¼" wavelength.

A suitable impedance match can be obtained with either the transition mechanisms of FIGS. 2 and 3 by local shaping of the fins near the interface with the electro-optic crystal and by controlling the position at which the surrounding passive film material ends with respect to the crystal. Additionally, the geometries of the crystal and electrodes must be configured to minimize high power arcing. Those skilled in the art will note that the transition mechanism detailed with respect to FIGS. 2 and 3 can equivalently be integrally fabricated with the modulator.

Referring now to FIG. 4, there is a simplified illustration of a circuit 52 having a reentrant microwave modulator Provided according to the present invention. Preferably, a reentrant microwave modulator has a housing with a dimension of 0.24" by 0.24" containing reentrant electrodes 0.024" wide at the contact interface with a 3 cm gallium phosphide bar having a cross-section of 0.048" by 0.048". in FIG. 4, the frequency shifter circuit 52 comprises a center reentrant microwave modulator 10 having the dimensions of 24 mils by 60 mils by 500 mils with a 3cm gallium phosphide bar having a cross-section of 0.048" by 0.048" as the active electro-optic element. The dielectric material used as the passive filler or surrogate material in an Emerson Cummings K12 material. The lowest cut-off frequency of the modulator without the material, that is, an empty structure, was determined using coaxial coupling loops attached to shorting plates located at the ends of the modulator. A measured cutoff frequency value of 5.52 GHz is in close agreement with a computed value of 5.62 GHz. With the modulator filled with material with the dielectric constant of 12, a value close to that of gallium phosphide, the cut-off frequencies are lowered to 1.78 GHz, While the next higher order TE and TM modes are reduced to 7 and 13 GHz, respectively. In practice, the dimensions of the housing should be reduced to raise these higher mode cutoff frequencies above the operating frequencies.

The circuit 52 also comprises a square waveguide 54 to excite two spatially orthogonal microwaves. The waveguide 54 receives the microwave signal from source 56 which can comprise a power divider, phase shift and orthogonal mode launchers as required for circular polarization. A transition circuit section 58 couples these traveling waves into the modulator. At the output end of the modulator, the microwave fields are sampled by probe 60 to check the quality of the circular polarization, and the energy is completely absorbed by matched load 61 to prevent reflections that would otherwise distort the phase linearity. Phase linearity is important to preserve the linearity of chirped microwave input signals.

A tunable infrared dye laser 62 (single frequency), $\Delta\omega 0$, (less than 0.1 GHz) with a circularly polarized output beam 64 of 15 mW is also included. The beam 64 is focused into the gallium phosphate crystal. The reentrant modulator is configured as a resonant cavity having a resonant frequency at 9.1 GHz.

The circuit 52 outputs a beam 66 having single sideband modulation with a circularly polarization rotating in the opposite direction of the carrier signal which can be separated from the carrier using a conventional duplexor (not shown). The spectral content of the output can be analyzed using a Fabry-Perot interferometer, also not shown, with a finesse of 200 and free spectral range of 7.5 GHz. The interferometer is preferable mounted in tandem With the duplexor. As a result of the modulation, the output spectrum of the beam 64 consists of the carrier ($\omega 0$) and the downshift sideband ($\omega 0-\omega m$) which is at 1.5 GHZ away from the carrier. The preferred embodiment generates a conversion efficiency of about 6 percent for a total input microwave power of 1 kilowatt.

Similarly, although the invention has been shown and described with respect to a preferred embodiment thereof, it should be understood by those skilled in the art that various other changes, omissions and additions thereto may be made therein without departing from the spirit and scope of the present invention.

I claim:

1. A reentrant electro-optic modulator for modulating a laser signal with a microwave signal to generate signals in a single frequency sideband, said modulator comprising:
   an outer housing extending along and coaxial with a propagation axis;
   a microwave electrode means including a plurality of electrode elements symmetrically configured within said housing along said propagation axis;
   an optically active element extending along said propagation axis within said electrode means for guiding the laser signal through the modulator; and
   a passive dielectric material positioned within housing activities formed adjacent said electrode elements: the modulator being characterized by an interface between said electrode elements and said optical element such that said optical element dimension substantially exceeds said electrode element dimension.

2. The modulator of claim 1 wherein said optical element comprises a gallium phosphide (GaP) crystal.

3. The modulator of claim 1 wherein said passive dielectric material comprises a material with a dielectric constant of 12.

4. The modulator of claim 3 wherein said optical element and said electrode element dimensions at said interface are 0.048" and 0.024", respectively.

5. The modulator of claim 1 wherein said elements each extend radially outward from said interface.

6. A transition structure for coupling microwave signals with a reentrant modulator having a plurality of symmetric electrode metal portions, said structure comprising,
   a plurality of metal fin electrodes each adapted to receive at a first end thereof a corresponding one of the modulator electrode metal portions; and
   each of said metal fin electrodes having a tapered Portion opposing said first end to provide an impedance match to an adjacent microwave signal carrying element.

7. The structure of claim 6 wherein said tapered portion comprises a linear taper.

8. The structure of claim 6 wherein said adjacent microwave signal carrying element is a square rectangular waveguide.

9. The structure of claim 6 wherein said metal fin electrode tapered portions are configured so that a central optical element of the reentrant modulator protrudes from said electrode first ends.

10. The structure of claim 6 wherein said metal fin electrode tapered portions are configured so that a central optical element of the reentrant modulator is recessed from said electrode first ends.

11. An optical frequency shifting circuit for providing carrier suppressed single sideband modulation at microwave frequencies of an optical signal, said circuit comprising:
    a microwave signal source means providing spatially orthogonal and time quadrature microwave signals, for launching circularly polarized orthogonal mode microwave signals;
    a first transition structure adapted to receive said microwave signals, including
    four fin electrodes each adapted to receive at a first end thereof a corresponding modulator electrode metal portion;
    each of said fin electrodes having a tapered portion opposing said first end to provide an impedance match to said microwave signal source means;
    a reentrant modulator receiving said first transition structure having first and second end portion, including
    an outer housing extending along and coaxial with a propagation axis;
    a microwave electrode means including four electrode elements symmetrically configured within said housing along said propagation axis;
    an optically active element extending along said propagation axis within said electrode means for guiding the laser signal through the modulator;
    a dielectric surrogate material positioned within housing cavities formed adjacent said elements;
    the modulator being characterized by an interface between said elements and said optical element such that said optical element dimension substantially exceeds said elements dimension;
    a second transition structure adapted to receive the modulator second end portion including
    a plurality of fin electrodes each adapted to receive at a first end thereof a corresponding one of the modulator electrode portions;

each of said fin electrodes having a tapered portion opposing said first end to provide an impedance match to an adjacent microwave signal carrying element; and a matched load configured with said second transition structure for terminating said microwave signals without reflection.

12. The modulator of claim 11 wherein said optical element comprises a gallium phosphide (GaP) crystal.

13. The modulator of claim 11 wherein said dielectric surrogate material comprises a material with a dielectric constant of 12.

14. The modulator of claim 13 wherein said optical element and said electrode elements at said interface are 0.029" and 0.024", respectively.

15. The modulator of claim 11 wherein said elements each extend radially outward from said interface.

16. The modulator of claim 11 wherein said optical element comprises gallium arsenide.

17. The modulator of claim 11 wherein said optical element comprises cadmium telluride.

18. The modulator of claim 1 wherein said electrode means is integral with said housing.

* * * * *

UNITED STATES PATENT AND TRADEMARK OFFICE
CERTIFICATE OF CORRECTION

PATENT NO. : 4,973,140

DATED : November 27, 1990

INVENTOR(S) : Cheo et al.

It is certified that error appears in the above-identified patent and that said Letters Patent is hereby corrected as shown below:

Column 2

Line 31, delete "adaPted" and substitute--adapted--.
    Line 49, delete "oPtically" and substitute--optically--.

Column 3

Line 27, "2" should be--21--.
    Line 48, delete "Waveguide" and substitute--waveguide--.

Column 5

Line 6, delete "When" and substitute--when--.
    Line 17, delete "With" and substitute--with--.

Column 6

Line 50, delete "in" and substitute--In--.
    Line 66, delete "While" and substitute--while--.

Column 7

Line 31, delete "With" and substitute--with--.
    Line 58, delete "activities" and substitute--cavities--.

Column 8

Line 14, delete "Portion " and substitue--portion--.

UNITED STATES PATENT AND TRADEMARK OFFICE
CERTIFICATE OF CORRECTION

PATENT NO.   :   4,973,140

DATED        :   November 27, 1990

INVENTOR(S) :   Cheo et al

It is certified that error appears in the above-identified patent and that said Letters Patent is hereby corrected as shown below:

Column 10

Line 3, delete "0.029" and substitute --0.049--.

Signed and Sealed this

Eleventh Day of August, 1992

*Attest:*

DOUGLAS B. COMER

*Attesting Officer*       *Acting Commissioner of Patents and Trademarks*